(12) United States Patent
Hsu et al.

(10) Patent No.: US 10,885,918 B2
(45) Date of Patent: Jan. 5, 2021

(54) SPEECH RECOGNITION USING PHONEME MATCHING

(71) Applicant: Microsoft Technology Licensing, LLC, Redmond, WA (US)

(72) Inventors: Wilson Hsu, Waterloo (CA); Kaheer Suleman, Cambridge (CA); Joshua Pantony, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/490,321

(22) Filed: Sep. 18, 2014

(65) Prior Publication Data

US 2015/0081293 A1   Mar. 19, 2015

Related U.S. Application Data

(60) Provisional application No. 61/879,796, filed on Sep. 19, 2013.

(51) Int. Cl.
*G10L 15/26* (2006.01)
*G10L 15/08* (2006.01)
(Continued)

(52) U.S. Cl.
CPC .............. *G10L 15/26* (2013.01); *G10L 15/06* (2013.01); *G10L 15/187* (2013.01); *G10L 15/22* (2013.01);
(Continued)

(58) Field of Classification Search
CPC .... G10L 2015/223; G10L 15/22; G10L 15/07
See application file for complete search history.

(56) References Cited

U.S. PATENT DOCUMENTS 6,088,671 A     7/2000   Gould et al.
6,487,534 B1   11/2002   Thelen et al.
(Continued)

FOREIGN PATENT DOCUMENTS

CN   1317783 A   10/2001
CN   1408182 A    4/2003
(Continued)

OTHER PUBLICATIONS

Carolina Parada et al: "A Spoken Term Detection Framework for Recovering Out-of-Vocabulary Words Using the Web", Proc. Interspeech, Sep. 30, 2010 (Sep. 30, 2010). Retrieved from the Internet: URL: http://www.clsp.jhu.edu/~carolinap/papers/oovrecovery_interspeech10.pdf [retrieved on Jan. 13, 2015].
(Continued)

*Primary Examiner* — Matthew H Baker

(57) ABSTRACT

A system, method and computer program is provided for generating customized text representations of audio commands. A first speech recognition module may be used for generating a first text representation of an audio command based on a general language grammar. A second speech recognition module may be used for generating a second text representation of the audio command, the second module including a custom language grammar that may include contacts for a particular user. Entity extraction is applied to the second text representation and the entities are checked against a file containing personal language. If the entities are found in the user-specific language, the two text representations may be fused into a combined text representation and named entity recognition may be performed again to extract further entities.

20 Claims, 9 Drawing Sheets

(51) Int. Cl.
*G10L 15/22* (2006.01)
*G10L 15/187* (2013.01)
*G10L 15/32* (2013.01)
*G10L 15/06* (2013.01)

(52) U.S. Cl.
CPC ........ *G10L 15/32* (2013.01); *G10L 2015/088* (2013.01)

(56) References Cited

U.S. PATENT DOCUMENTS

| | | | |
|---|---|---|---|
| 6,523,061 B1 | 2/2003 | Halverson et al. | |
| 6,546,401 B1 | 4/2003 | Iizuka et al. | |
| 6,609,091 B1 | 8/2003 | Budzinski | |
| 6,738,743 B2 | 5/2004 | Sharma et al. | |
| 6,745,161 B1 | 6/2004 | Arnold et al. | |
| 6,839,669 B1 | 1/2005 | Gould et al. | |
| 7,013,275 B2 | 3/2006 | Arnold et al. | |
| 7,228,277 B2 | 6/2007 | Nagashima | |
| 7,401,132 B1 | 7/2008 | Krumel et al. | |
| 7,624,018 B2 | 11/2009 | Chambers et al. | |
| 7,716,051 B2 | 5/2010 | Dow et al. | |
| 7,747,782 B2 | 6/2010 | Hunt et al. | |
| 7,983,911 B2 | 7/2011 | Soufflet et al. | |
| 8,150,678 B2 | 4/2012 | Sagawa | |
| 8,224,644 B2 | 7/2012 | Krumel et al. | |
| 8,249,877 B2 | 8/2012 | Koll | |
| 8,364,481 B2 | 1/2013 | Strobe et al. | |
| 8,831,947 B2* | 9/2014 | Wasserblat | G10L 15/08 704/231 |
| 8,930,194 B2 | 1/2015 | Newman et al. | |
| 8,949,130 B2 | 2/2015 | Phillips | |
| 8,972,263 B2 | 3/2015 | Stonehocker et al. | |
| 9,190,056 B2* | 11/2015 | Zhu | G10L 15/22 |
| 9,201,965 B1* | 12/2015 | Gannu | G06F 17/30761 |
| 9,208,787 B2 | 12/2015 | Hayn et al. | |
| 9,305,545 B2 | 4/2016 | Cheung | |
| 9,502,029 B1* | 11/2016 | Bell | G10L 15/22 |
| 9,530,416 B2* | 12/2016 | Stern | G10L 15/30 |
| 9,601,108 B2 | 3/2017 | Wilson et al. | |
| 2002/0013706 A1* | 1/2002 | Profio | G10L 15/08 704/254 |
| 2002/0120448 A1* | 8/2002 | Garner | G10L 15/12 704/254 |
| 2002/0143551 A1 | 10/2002 | Sharma et al. | |
| 2003/0028376 A1* | 2/2003 | Meron | G10L 13/06 704/258 |
| 2003/0125869 A1* | 7/2003 | Adams, Jr. | G01C 21/20 701/532 |
| 2003/0177009 A1 | 9/2003 | Odinak et al. | |
| 2003/0233237 A1 | 12/2003 | Garside et al. | |
| 2004/0098263 A1 | 5/2004 | Hwang et al. | |
| 2004/0107088 A1 | 6/2004 | Budzinski | |
| 2005/0102142 A1 | 5/2005 | Soufflet et al. | |
| 2005/0203740 A1 | 9/2005 | Chambers et al. | |
| 2007/0043566 A1 | 2/2007 | Chestnut et al. | |
| 2007/0043687 A1 | 2/2007 | Bodart et al. | |
| 2007/0067305 A1 | 3/2007 | Ives | |
| 2007/0179778 A1 | 8/2007 | Gong et al. | |
| 2007/0276651 A1 | 11/2007 | Bliss et al. | |
| 2008/0005057 A1 | 1/2008 | Ozzie et al. | |
| 2008/0059193 A1* | 3/2008 | Huang | G10L 15/00 704/260 |
| 2008/0154870 A1 | 6/2008 | Evermann et al. | |
| 2009/0055185 A1* | 2/2009 | Nakade | G10L 15/30 704/257 |
| 2009/0177462 A1 | 7/2009 | Alfven | |
| 2010/0082343 A1* | 4/2010 | Levit | G10L 15/32 704/257 |
| 2010/0114577 A1 | 5/2010 | Hayn et al. | |
| 2010/0161328 A1 | 6/2010 | Krumel et al. | |
| 2010/0268534 A1* | 10/2010 | Kishan Thambiratnam | G10L 15/07 704/235 |
| 2011/0112921 A1 | 5/2011 | Kennewick et al. | |
| 2011/0288857 A1 | 11/2011 | Carraux et al. | |
| 2011/0289076 A1 | 11/2011 | Boyle et al. | |
| 2012/0053935 A1* | 3/2012 | Malegaonkar | G10L 15/07 704/235 |
| 2012/0179471 A1 | 7/2012 | Newman et al. | |
| 2012/0215539 A1 | 8/2012 | Juneja | |
| 2012/0296644 A1 | 11/2012 | Koll | |
| 2013/0028443 A1 | 1/2013 | Pance et al. | |
| 2013/0030804 A1* | 1/2013 | Zavaliagkos | G10L 15/26 704/235 |
| 2013/0060571 A1 | 3/2013 | Soemo et al. | |
| 2013/0085753 A1 | 4/2013 | Bringert et al. | |
| 2013/0132084 A1 | 5/2013 | Stonehocker et al. | |
| 2013/0332162 A1* | 12/2013 | Keen | G10L 15/26 704/235 |
| 2013/0337853 A1 | 12/2013 | Kom et al. | |
| 2013/0346078 A1 | 12/2013 | Gruenstein et al. | |
| 2014/0059603 A1 | 2/2014 | Lee et al. | |
| 2014/0122071 A1* | 5/2014 | Sierawski | G10L 15/26 704/235 |
| 2014/0207442 A1 | 7/2014 | Ganong et al. | |
| 2014/0278411 A1 | 9/2014 | Cheung | |
| 2014/0288932 A1* | 9/2014 | Yeracaris | G10L 15/30 704/249 |
| 2014/0365216 A1* | 12/2014 | Gruber | G10L 13/027 704/235 |
| 2015/0106096 A1* | 4/2015 | Toopran | G10L 15/193 704/244 |
| 2015/0120288 A1 | 4/2015 | Thomson et al. | |
| 2015/0161985 A1* | 6/2015 | Peng | G10L 15/26 704/235 |
| 2015/0206528 A1 | 7/2015 | Wilson et al. | |
| 2015/0281401 A1 | 10/2015 | Le et al. | |
| 2015/0314454 A1 | 11/2015 | Breazeal et al. | |
| 2017/0162204 A1 | 6/2017 | Wilson et al. | |

FOREIGN PATENT DOCUMENTS

| | | | |
|---|---|---|---|
| CN | 101454775 A | 6/2009 | |
| CN | 102469112 A | 5/2012 | |
| CN | 102496364 A | 6/2012 | |
| CN | 102594717 A | 7/2012 | |
| CN | 102760431 A | 10/2012 | |
| CN | 103165130 A | 6/2013 | |
| CN | 103491429 A | 1/2014 | |
| EP | 1136983 A1 | 9/2001 | |
| EP | 1475778 A1 | 11/2004 | |
| JP | 10171490 A | 6/1998 | |
| WO | 02103675 A1 | 12/2002 | |
| WO | 2009145796 A1 | 12/2009 | |
| WO | WO-2015026366 A1 * | 2/2015 | G10L 15/08 |

OTHER PUBLICATIONS

Counterpart European Patent Application No. 14185452.1, "Extended European Search Report" dated Jan. 28, 2015.
"Apple-iOS 7-Siri", Retrieved from http://www.apple.com/ios/siri/, Sep. 15, 2012, 6 Pages.
"IBM Via Voice Gold Quick References", In IBM, 46 Pages.
"Speech Recognition in Office XP", Retrieved from https://web.archive.org/web/20040228013925/http://www.microsoft.com/office/previous/xp/speech.asp, May 30, 2001, 3 Pages.
"Using Speech Recognition for the First Time in Office", Retrieved from http://office.microsoft.com/en-us/assistance/HA010565111033.aspx, Retrieved on Sep. 20, 2006, 3 Pages.
"Your Pad or MiPad", Retrieved from https://web.archive.org/web/20060531221642/http://research.microsoft.com/research/srg/mipad.aspx, Retrieved on Sep. 20, 2006, 2 Pages.
"Non-Final Office Action Issued in U.S. Appl. No. 10/799,356", dated Oct. 8, 2008, 10 Pages.
"Non-Final Office Action Issued in U.S. Appl. No. 10/799,356", dated Nov. 14, 2008, 9 Pages.
"Final Office Action Issued in U.S. Appl. No. 10/799,356", dated Nov. 19, 2007, 10 Pages.
"Final Office Action Issued in U.S. Appl. No. 10/799,356", dated Apr. 17, 2009, 9 Pages.

(56) References Cited

OTHER PUBLICATIONS

"Non-Final Office Action Issued in U.S. Appl. No. 10/799,356", dated Jun. 5, 2007, 8 Pages.
"Non-Final Office Action Issued in U.S. Appl. No. 12/337,810", dated Nov. 30, 2011, 7 Pages.
"Non-Final Office Action Issued in U.S. Appl. No. 14/158,147", dated Dec. 31, 2015, 12 Pages.
"Final Office Action Issued in U.S. Appl. No. 14/158,147", dated Jun. 10, 2016, 30 Pages.
"Final Office Action Issued in U.S. Appl. No. 14/480,422", dated Apr. 17, 2018, 23 Pages.
"Non Final Office Action Issued in U.S. Appl. No. 14/480,422", dated Sep. 13, 2016, 26 Pages.
"Non Final Office Action Issued in U.S. Appl. No. 14/480,422", dated Jul. 13, 2017, 29 Pages.
"Non Final Office Action Issued in U.S. Appl. No. 15/426,640", dated Jun. 28, 2018, 10 Pages.
Acero, et al., "Live Search for Mobile:Web Services by Voice on the Cellphone", In Proceedings of the IEEE International Conference on Acoustics, Speech and Signal Processing, Mar. 31, 2008, pp. 5256-5259.
Barlas, Omar, "ILLUMINATOR—Natural User Interface Application to Control other Windows Apps", Retrieved from http://www.codeproject.com/Articles/640283/ILLUMINATOR-Natural-User-Interface-Application-to, Aug. 21, 2013, 5 Pages.
Beutler, et al., "Integrating Statistical and Rule-Based Knowledge for Continuous German Speech Recognition", In Eighth European Conference on Speech Communication and Technology, Sep. 1, 2003, pp. 937-940.
Hocek, Adam, "VoiceXML and Next-Generation Voice Services", In Proceedings of the XML Conference and Exposition, Jan. 2002, 15 Pages.
Mace, Michael, "Mobile Opportunity", Retrieved from http://mobileopportunity.blogspot.com/2005/11/web-30.html, Oct. 14, 2008, 9 Pages.
Miranda, et al., "A Platform of Distributed Speech Recognition for the European Portuguese Language", In Proceedings of 8th International Conference on Computational Processing of the Portuguese Language, Sep. 8, 2008, 10 Pages.
Morde, et al., "A Multi Modal System for Accessing Driving Directions", In Proceedings of the 5th International Workshop on Document Analysis Systems, Aug. 19, 2002, pp. 556-567.
Nusca, Andrew, "How Apple's Siri Really Works", Retrieved from http://www.zdnet.com/blog/btl/how-apples-siri-really-works/62461, Nov. 3, 2011, 9 Pages.
O'Grady, Jason D., "Siri Hacked to Work with Spotify, Instagram and Other Third-Party Apps", Retrieved from http://www.zdnet.com/siri-hacked-to-work-with-spotify-instagram-and-other-third-party-apps-7000027023/, Mar. 5, 2014, 6 Pages.

"International Preliminary Report on Patentability Issued in PCT Application No. PCT/U52015/010943", dated Feb. 5, 2016, 5 Pages.
"International Search Report and Written Opinion Issued in PCT Patent Application No. PCT/U52015/010943", dated Mar. 9, 2015, 10 Pages.
"International Preliminary Report on Patentability Issued in PCT Application No. PCT/US2015/023228", dated Jun. 16, 2016, 6 Pages.
"International Search Report and Written Opinion Issued in PCT Application No. PCT/US2015/023228", dated Jul. 29, 2015, 9 Pages.
"Second Written Opinion Issued in PCT Application No. PCT/US2015/023228", dated Feb. 8, 2016, 5 Pages.
Savitz, Eric, "Beyond Voice Recognition: It's The Age of Intelligent Systems", Retrieved from http://www.forbes.com/sites/ciocentral/2013/01/11/beyond-voice-recognition-its-the-age-of-intelligent-systems, Jan. 11, 2013, 5 Pages.
Turunen, et al., "Spoken and Multimodal Communication Systems in Mobile Settings", In Verbal and Nonverbal Communication Behaviours, Jan. 2007, pp. 227-241.
"Non Final Office Action Issued in U.S. Appl. No. 14/480,422", dated Jan. 14, 2019, 21 Pages.
"Office Action Issued in Chinese Patent Application No. 201580018588.6", dated Feb. 2, 2019, 16 Pages.
"Office Action Issued in European Patent Application No. 15723339.6", dated Aug. 9, 2018, 8 Pages.
"Office Action Issued in Chinese Patent Application No. 201580004735.4", dated Feb. 28, 2019, 10 Pages.
"Second Office Action Issued in Chinese Patent Application No. 201580018588.6", dated Aug. 1, 2019, 11 Pages.
"Final Office Action Issued in U.S. Appl. No. 14/480,422", dated Oct. 4, 2019, 18 Pages.
"Summons to Attend Oral Issued in European Patent Application No. 15723339.6", Mailed Date: Nov. 11, 2019, 7 Pages.
"Third Office Action and Search Report Issued in Chinese Patent Application No. 201580018588.6", dated Dec. 9, 2019, 14 Pages.
"Summons to Attend Oral Proceedings Issued in European Patent Application No. 15723339.6", Mailed Date: Mar. 18, 2020, 6 Pages.
"Fourth Office Action Issued in Chinese Patent Application No. 201580018588.6", dated Jun. 30, 2020, 7 Pages.
"Office Action Issued in Indian Patent Application No. 201647031933", dated Aug. 13, 2020, 7 Pages.
"Notice of Allowance Issued in Chinese Patent Application No. 201580018588.6", dated Sep. 23, 2020, 8 Pages.
Xianglan, Chen, "Study on Service Oriented Distributed Operating System and Key Issues in Service Composition", In dissertation submitted in partial fulfillment of the requirement for the degree of Doctor of Philosophy, Department of Computer Science and Technology, University of Science and Technology of China, Sep. 2007, 173 Pages.

* cited by examiner

SPEECH RECOGNITION USING PHONEME MATCHING

RELATED APPLICATIONS

This application claims priority from U.S. Provisional Patent Application No. 61/879,796, filed Sep. 19, 2013, the contents of which are incorporated herein by reference.

FIELD

The present disclosure relates to speech recognition of audio input to a mobile device such as a smartphone, and more particularly, to converting audio input into a text representation for further processing.

BACKGROUND

It is well known that many speech recognition systems can achieve high levels of accuracy when the domain is well defined and/or specialized. For example, a speech recognition system designed for medical practitioners may achieve a high level of accuracy because the language model used by the speech recognition system contains specific words commonly expressed by a medical practitioner. The speech recognition system optimized for the medical field may perform very poorly, however, if the user expresses terms from another profession, for example, law.

General language speech recognition systems employ general language models and may also achieve acceptable levels of accuracy for some applications. General systems, however, suffer from low accuracy when certain words and phrases are expressed by a user that is not contained in the language model of the speech recognition system. For example, general language models may not contain specialist jargon (such as medical terms), words from a different language, and/or certain proper nouns. When a user expresses a word or phrase that is not provided in the language model(s), the system will attempt to find the best match which unfortunately will be incorrect.

This can be problematic in certain situations where the accuracy of a speech recognition system is important such as in medical dictation as well as natural language processing systems that attempt to understand the meaning expressed by the user. For example, a user may express a term that includes a person's name such as "John Artinian". A general speech recognition system may pick up the name "John" correctly since it is a common name for English speakers, but the system may not pick up "Artinian" because it is a less common surname and may not be contained within the language model of the system.

There are techniques for improving the accuracy of a language model by adding words and phrases to the language model that are personalized for a particular user. This solution, however, is not always feasible where a third party provides a speech recognition system in a black box format that cannot be modified.

SUMMARY

This summary is provided to introduce a selection of representative concepts in a simplified form that are further described below in the detailed description. This summary is not intended to identify key features or essential features of the claimed subject matter, nor is it intended to be used in any way that would limit the scope of the claimed subject matter.

Broadly speaking, the invention relates to a personalized speech recognizer suitable for transforming audio input into a digital representation thereof such as a text string. The audio input may be an audio file on a computer and/or a command received by one or more microphones on a computing device such as a smartphone. In one embodiment, a software application that runs on a smartphone presents an interface for receiving spoken audio commands. Voice commands can be received at the user interface, which communicates the voiced audio command (in a digital format) to an intelligent services engine.

In one embodiment, the invention includes a general automatic speech recognition module for recognizing general language and a personalized speech module for recognizing personalized language such as contact names. A phoneme generator may be provided that creates a phonetic representation of an input command as well as a phonetic representation of each word and phrase in personal language associated with a specific profile or user. In various embodiments, a comparator may be employed to compare the phonetic representation of the personalized language with the phonetic representation of the input command and to determine the likelihood that some personal language is embodied in the command. Various techniques may be used alone or in combination by the comparator to determine the likelihood, such as dynamic programming techniques, A* (star) search algorithms, Viterbi algorithm and so forth. If the likelihood that one or more words of the personal language is present in the command is above a predetermine threshold, a substitution module may create a second text representation of the command that incorporates at least some of the personal language. In some embodiments, the second text representation is provided to an NLP engine 214 and a services engine 200 for deriving the intent of the input command, and for performing one or more tasks according to the derived intent.

In accordance with an aspect of the specification, there is provided a method implemented in a computer system having at least one processor and at least one memory for converting an audio file into a text representation thereof. The method involves maintaining an automatic speech recognition system configured to receive the audio file as an input and to generate a first text representation of the audio file; receiving the audio input and generating a first text representation thereof using the automatic speech recognition system; capturing a plurality of personalized words stored on a computing device and maintaining in the computer system the plurality of personalized words; creating a phonetic representation of each said plurality of personalized words and said first text representation; comparing said phonetic representation of each said plurality of personalized words with said phonetic representation of said first text representation to determine the likelihood that at least one of said plurality of personalized words is present in the audio file; and for a likelihood that at least one of the plurality of personalized words is present in the audio file above a predetermined threshold, returning a result indicating that at least one of the plurality of personalized words is present in the first representation, the result further indicating the location of the at least one of plurality of personalized words and their associated position in the first representation. The audio file may be created when a voiced command is received at a microphone of the computing device. The plurality of personalized words may include contact names from an address book stored on the computing device. The method may further involve substituting at least a portion of the first representation with at least one word from said plurality of personalized words to create a second representation of the audio input.

In accordance with an aspect of the specification, there is provided a computer system for converting an audio file into a text representation thereof wherein the audio file may include personal words associated with a specific user. The system includes an automatic speech recognition system configured to receive the audio file as an input and to generate a first text representation of the audio file; a computing device for providing the audio file to automatic speech recognition system; a data transfer module configured to retrieve personal language from the computing device and for providing personal language to a phone generator, the personal language comprising a plurality of personal words; the phoneme generator configured to creating a phonetic representation of each said plurality of personal words and said first text representation; and a comparator configured to compare said phonetic representation of each said plurality of personalized words with said phonetic representation of said first text representation to determine a likelihood that at least one of said plurality of personalized words is present in the audio file. The comparator may be further configured, for the likelihood above a predetermined threshold, to provide a result indicating the at least one of the plurality of personal words present in the first representation and the position of the at least one plurality of personal words in the first text representation. The system may further include a text substitution module configured, for a likelihood above a predetermined threshold, to substitute at least a portion of the first representation with at least one word from said plurality of personal words to create a second text representation of the audio input. The audio file may be created when a user expresses a voiced command to at least one microphone of the computing device. The personal language may include contact names from the address book. The personal language may include locations within a predetermined distance from a specific location. The personal language may include words commonly accessed. The personal language may be provided by a data transfer module to the phone generator at predetermined periodic intervals. The system may further include an application located on the device configured to provide an interface to input an audio input. The system may further include a personalized speech recognizer for converting an audio file into a text representation thereof wherein the audio file may include personal words.

Other aspects and advantages of the invention will become apparent from the following detailed description taken in conjunction with the accompanying drawings which illustrate, by way of example, the principles of the invention.

BRIEF DESCRIPTION OF THE DRAWINGS

Reference will now be made, by way of example only, to the accompanying drawings in which.

DETAILED DESCRIPTION

Figure 1:
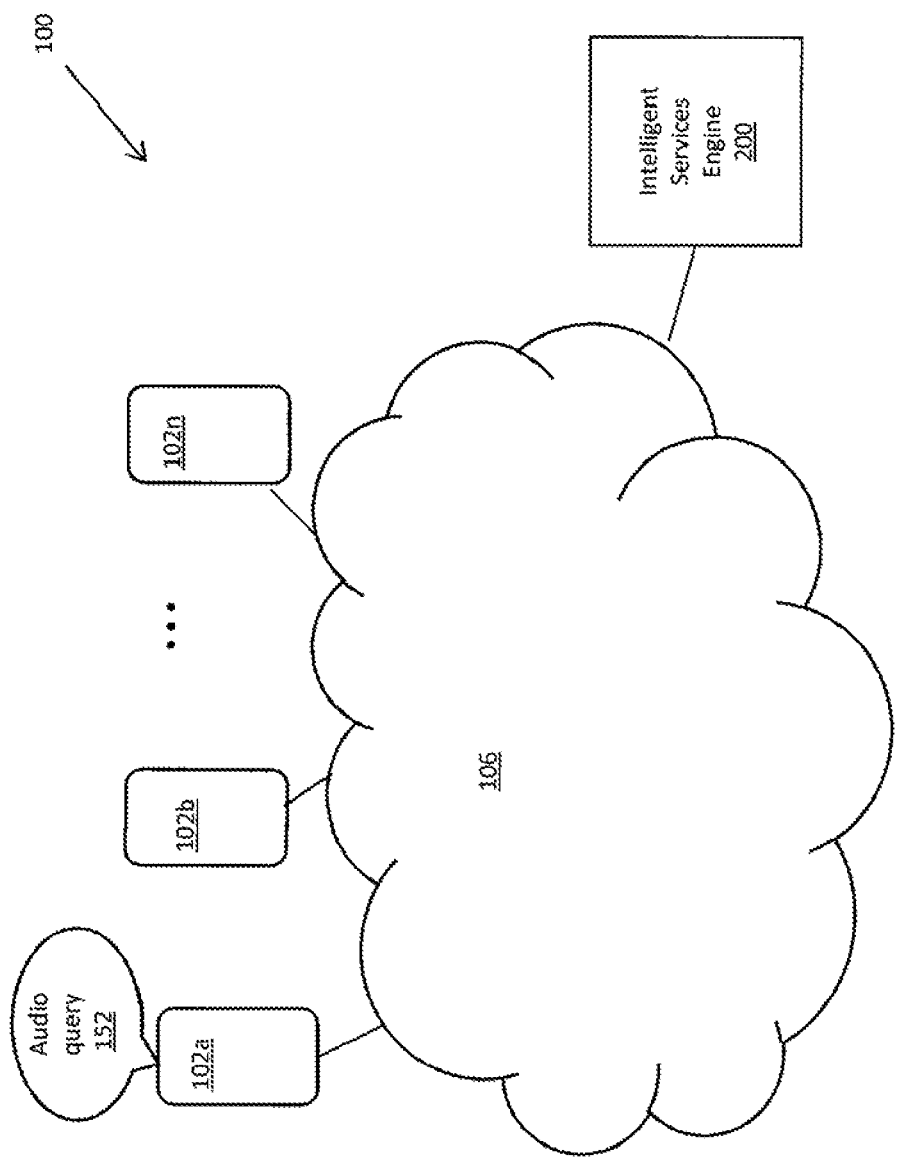
FIG. 1 is a block diagram of an exemplary networked environment of an intelligent services system for providing information and tasks according to one embodiment.

Reference is first made to FIG. 1 which illustrates an exemplary networked environment 100 configured to provide services and/or information to devices 102*a*-102*n*. In one embodiment, an input command 152 can be received at an application 101 on the computing device 102 (such as a smartphone) which directs the audio command or a text representation thereof to an Intelligent Services Engine 200 for processing. The intelligent services engine 200 may include a Natural Language Processing Engine 214 (hereinafter referred to as NLP engine 214) configured to derive the intent of the input command 152 and extract relevant entities form the input command 152. As will be appreciated, the intelligent services engine 200 can be access simultaneously by several computing devices smartphones 102*a*, *b* . . . *n* over a wired and/or wireless network 106 such as the Internet.

Figure 2:
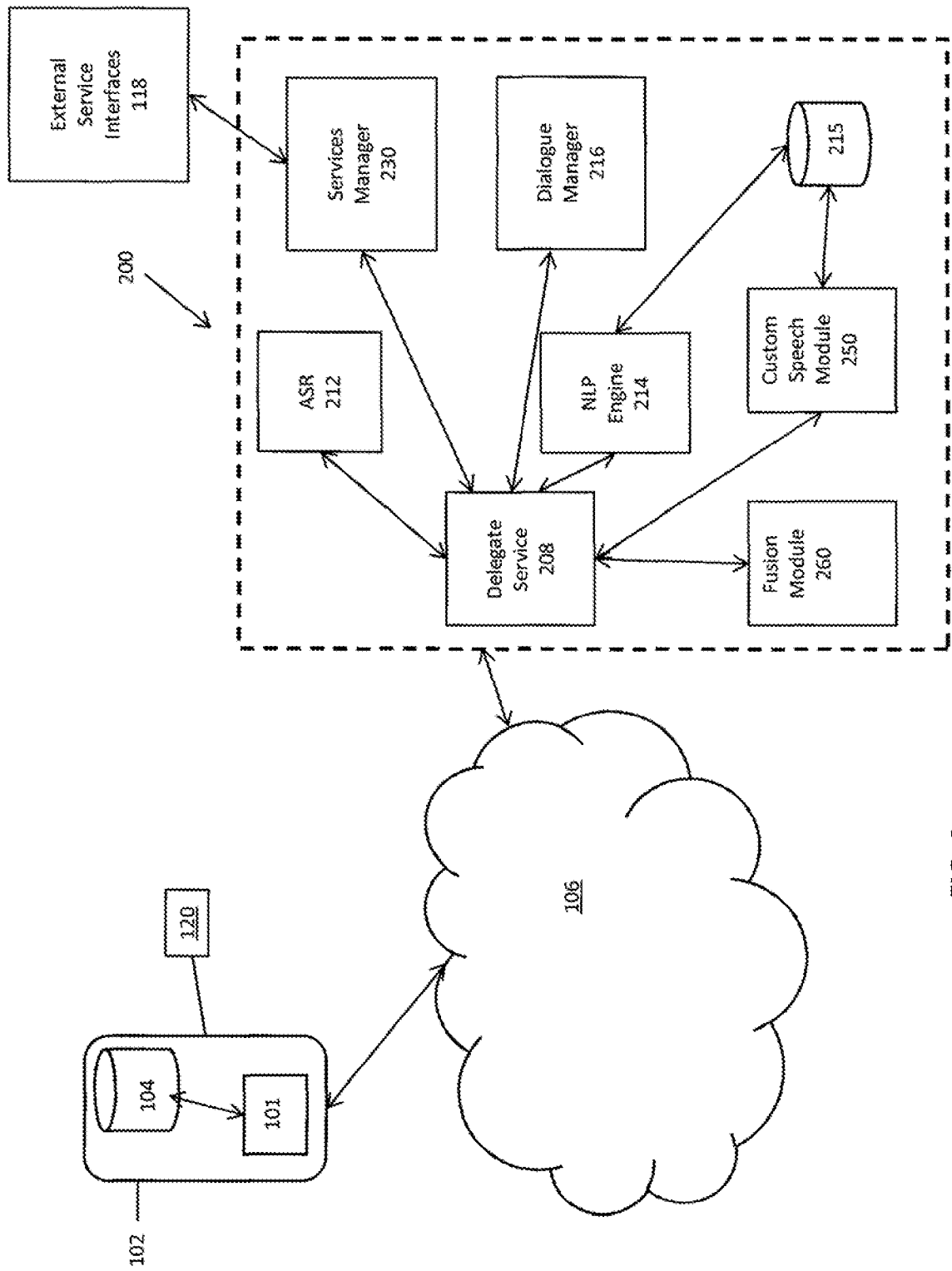
FIG. 2 is a block diagram showing an intelligent services engine that employs the personalized speech recognizer of the invention, according to one embodiment.

FIG. 2 illustrates a block diagram of one embodiment of the intelligent services engine 200 that may employ the personalized speech recognizer of the invention. The intelligent services engine 200 includes an Automatic Speech Recognition Module 212 (hereinafter referred to as is configured to as ASR module 212 or general ASR module 212) configured to convert the input command 152 into a general text representation. The ASR module 212 may include a general language model that is able to recognize a significant portion of the words of a natural language such as English, but the general language model does not recognize certain specific language such as non-English personal names. ASR module 212 may be distributed throughout a network or may reside on computing device such as a server or computing device 102. A Custom Speech Module 250 may be included in the environment 100 to supplement the capabilities of ASR module 212. In some embodiments, the custom (personal) speech module 250 is adapted to recognize personal language, such as names in a contact list on computing device 102.

The intelligent services engine 200 may include several components/modules that facilitate the processing of voice commands 152 as well as intelligently deriving the intention of the input command (based on command 152) as well as selecting an appropriate internal service 120 or external service 118 adapted to perform the task based on the derived intent.

The computing device 102 may be a laptop or desktop computer, a cellular telephone, a smartphone, a set top box, and so forth to access the intelligent services engine 200. The intelligent services engine 200 may include an application (e.g. application 101) resident on the computing device 102 which provides an interface for accessing the services engine 200 and for receiving output and results produced by the services engine 200 and/or external providers in communication with the services engine 200.

Accordingly, the intelligent services engine 200 can obtain services and/or control the computing device 102 (eg. a smartphone) based on expressing commands and queries received by the application 101. For example, the Internet can be searched for information by providing an appropriate query or input command 152 to the computing device 102 such as "What is the capital city of Germany?" The application 101 receives the audio query by interfacing with the microphone(s) on the computing device 102, and may direct the audio query to the intelligent services engine 200. Modules 208, 212, 214, 250, 216, 230, 260 and the like cooperate to convert the audio query into a text query, derive the intention of the input command, and perform commands according to the derived intention of the input command 152. In some exemplary embodiments, the input command can be received in audio form and/or by using other input modes such as touchscreen, mouse, keyboard, and so forth alone or in combination with each other.

ASR module 212 may include one or more audio models 924 and one or more language models 922 (FIG. 9) that are used by ASR module 112 to perform speech recognition on input command 152 and to provide a general text string representation of the query. General text string representation may also be referred to as text command 202 in this specification. In one embodiment, an audio command may be converted into a raw audio file on the computing device 102, and sent to the ASR module 112 of the engine 200 for conversion into general text command 202.

In some exemplary embodiments, computing device 102 may include one or more databases 104 having digital files that contain personalized information that may not be available in the language model 922 of ASR engine 112. For convenience, digital information that is stored on computing device 102 and is accessible by application 101 will be referred to herein as database 104. Personalized information that may be in database 104 includes address book contacts, location names such as street names, restaurant names, professional jargon (for example, legal terms in a memo file), common words that may be unique to a specific user account or location, and the like.

Figure 4:
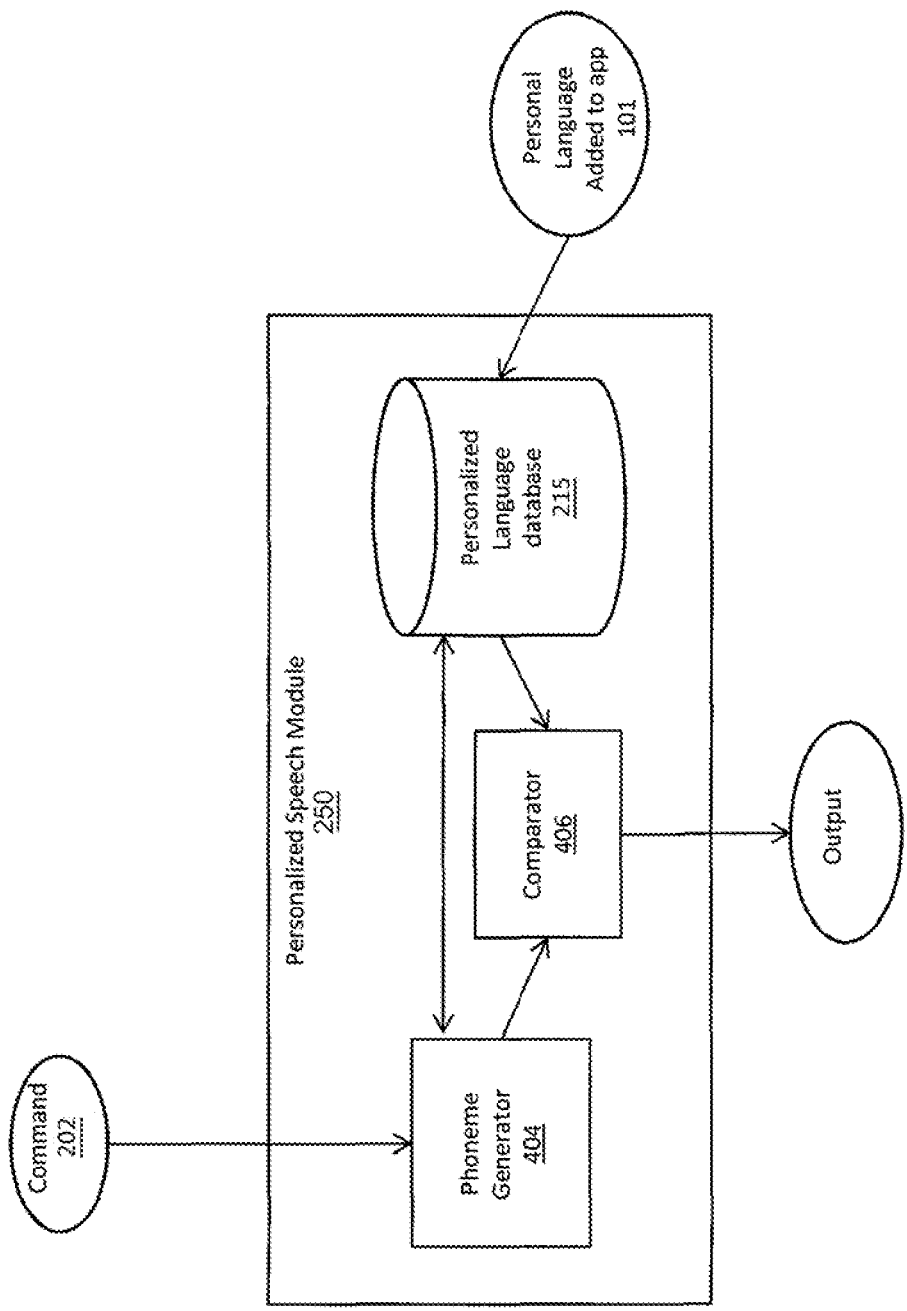
FIG. 4 is a block diagram showing an exemplary personalized speech recognizer according to one embodiment.

Referring now to FIG. 4, an exemplary personalized speech module 250 is illustrated that may be used in a networked environment, such as by the intelligent services engine 200 shown in FIG. 2. Personalized speech module 250 may include a personalized language database 215 that contain words and phrases included on computing device 102 (in database 104) as well as provided via a separate input process. In some embodiments, application 101 updates personalized language database 215 with words from database 104 at periodic times and/or upon the happening of certain events. For example, application 101 may update database 215 with information from database 104 when the application 101 is launched for the first time, when certain services 118, 120 are accessed via the services engine 200, and at other suitable times. In some exemplary embodiments, intelligent services engine 200 updates NL engine 214 with information from database 104 by directly pulling the information from computing device 102 and/or by accessing cloud storage (not shown). In some embodiments, application 101 updates personal language database 215 whenever personal language is added via application 101, for example, when adding a contact. In one embodiment, application 101 updates personal language database 215 when personal language is synchronized to application 101 such when application 101 pulls friend information from social media sites such as FACEBOOK.

In various embodiments, personalized speech module 250 receives commands 202 as an input from ASR module 212 (or any other component of engine 200). A command 202 is a digital representation (such as a text string) provided by ASR module 212 of the input command 152 expressed or otherwise provided. ASR module 212 may employ various methods, operations, components, etc. to convert the audio query into command 202 as will be appreciated to a person skilled in the art. Personal language database 215 may also be provided from database 104 as an input to the personalized speech module 250 as described herein. Personalized speech module 250 may be used in a system in which the input command 152 is not directly available personalized speech module 250. For example, in certain mobile operating systems, an ASR module 212 is provided that may be accessed via an API; however, the operating system does not allow a third-party application 101 to directly access the audio input received by the microphone of the computing device 102. Personalized speech module 250 is configured to supplement the command 202 with personal language, and in some cases, is configured to create a second text representation that incorporates some words from the command 202 as well as some words from the personal language in database 215.

Figure 3:
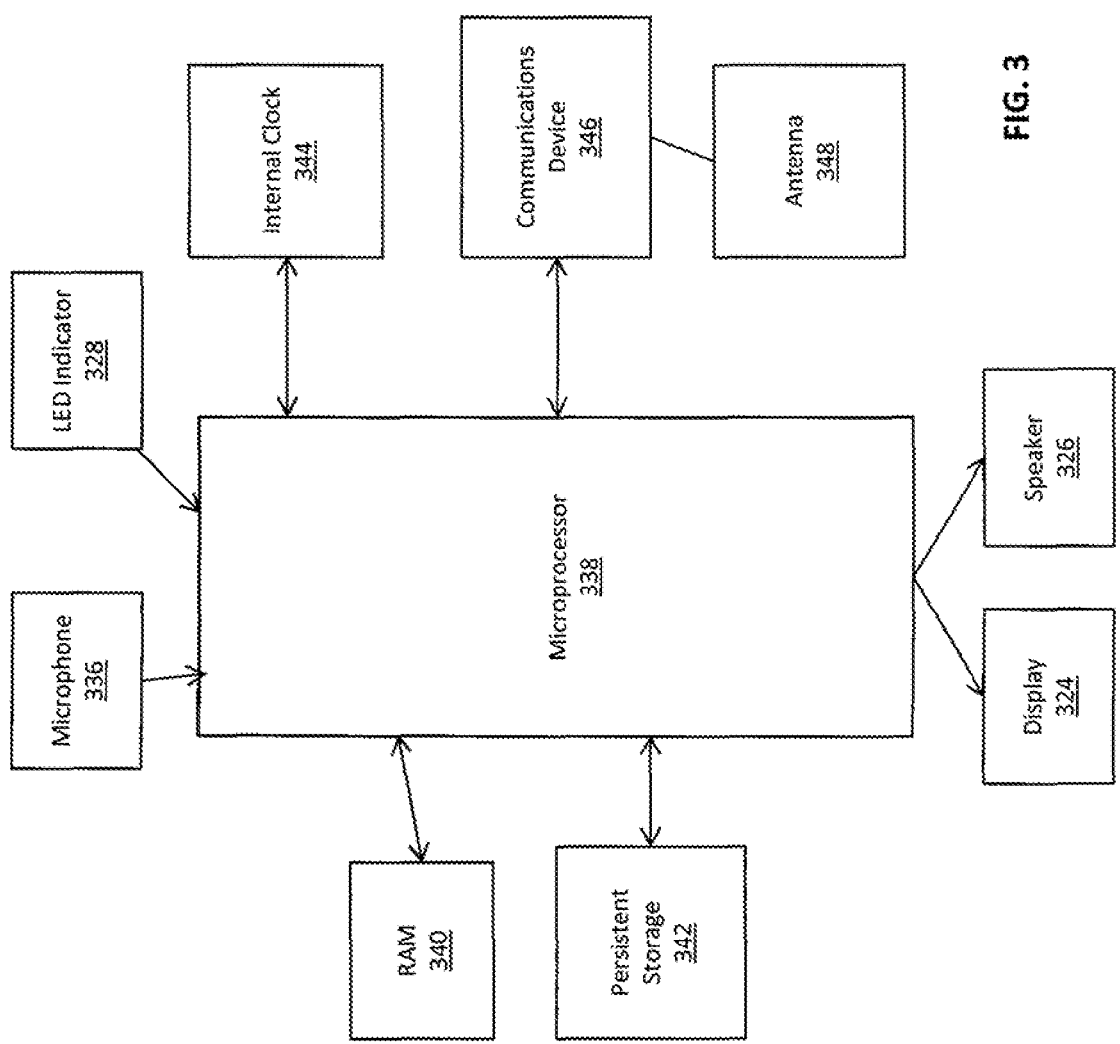
FIG. 3 is a block diagram of some components of an exemplary smartphone that may be used with one embodiment.

Referring to FIG. 3, a block diagram of certain components of a computing device in accordance with an embodiment is indicated generally by the numeral 102. In various exemplary embodiments, the computing device 102 is based on the computing environment and functionality of a hand-held wireless communication device which may be referred to herein as computing device 102. It will be understood, however, that the electronic device is not limited to a hand-held wireless communication device. Other electronic devices are possible, such as laptop computers, personal computers, set-top boxes, electronic voice assistants in vehicles, and the like.

Computing device 102 is based on a microcomputer that includes a microprocessor 338 (also referred to herein as a processor) connected to a random access memory unit (RAM) 340 and a persistent storage device 342 that is responsible for various non-volatile storage functions of the computing device 102. Operating system software executable by the microprocessor 338 is stored in the persistent storage device 342, which in various embodiments is flash memory. It will be appreciated, however, that the operating system software can be stored in other types of memory such as read-only memory (ROM). The microprocessor 338 receives input from various input devices including the touchscreen 330, communications device 346, and microphone 336, and outputs to various output devices including the display 324, the speaker 326 and the LED indicator(s) 328. The microprocessor 338 is also connected to an internal clock 344.

In various embodiments, the computing device 102 is a two-way RF communication device having voice and data communication capabilities. Computing device 102 also includes Internet communication capabilities via one or more networks such as cellular networks, satellite networks, Wi-Fi networks and so forth. Two-way RF communication is facilitated by a communications device 346 that is used to connect to and operate with a data-only network or a complex voice and data network (for example GSM/GPRS, CDMA, EDGE, UMTS or CDMA2000 network, fourth generation technologies, etc.), via the antenna 348.

Although not shown, a battery provides power to all active elements of the computing device 102.

The persistent storage device 342 also stores a plurality of applications executable by the microprocessor 338 that enable the smartphone to perform certain operations including the communication operations referred to above. Other applications software is provided including, for example, an email application, a Web browser application, an address book application, a calendar application, a profiles application, and others that may employ the functionality of the invention. Various applications and services on computing device 102 may provide application programming interfaces to a service 120 for allowing other software modules to access the functionality and/or information available by interfaces to service 120.

Turning to FIG. 4, a phoneme generator 404 may be provided for converting digital representations of and phrases (e.g. text strings) into their corresponding phonetic representation made up of a sequence of phonemes. A phoneme is a basic element of a given language or dialect, from which words in that language or dialect are analyzed as being built up. The phoneme may be thought of as the smallest segmental unit of sound employed to form meaningful contrasts between utterances. A phoneme is generally regarded as an abstraction of a set (or equivalence class) of speech sounds (phones) which are perceived as equivalent to each other in a given language. In some exemplary embodiments, the phonetic representation of a particular word or phrase is a sequence of phonemes in which each phoneme is represented by a unique character string.

Phoneme generator 404 may be configured in various embodiments to generate a phonetic representation of words in database 215 periodically, each time a command 152 is provided as an input, each time the ASR engine 112 is invoked, each time application 101 is launched and/or at other times. The phonetic representation of words in database 215 may also be stored in database 215 and/or in another data structure in communication with personalized speech module 250.

When a command such as "What is the capital of France?" is received, the command is converted by ASR engine 112 into a text command 202 which is directed to personalized speech module 250. Phoneme generator 404 receives the command 202 and generates a phonetic representation of the command 202 which includes one or more phonemes. In some embodiments, phoneme generator 404 stores the phonetic representation of each command 202 in database 215 or another data structure so that identical commands to do not have to be converted into a phonetic representation each time.

In various embodiments, a comparator 406 may be provided for comparing the phonetic representation of text command 202 (as it is provided by ASR module 112) with the phonetic representation of each word and/or phrase in the personalized language database 215. One purpose of the comparator 406 is to determine if any words in the personalized language database 215 are embodied in the input command 152 expressed and/or provided. Comparator 406 may employ suitable search algorithms alone or in combination such as dynamic programming techniques, A* (star) search algorithms, Viterbi algorithm and so forth. In various embodiments, comparator 406 may return one or more pieces of information such as the personal words/phrases determine to likely be in the command 202, the location of the words/phrases in the command (e.g. as a first and last position pair), the likelihood that the words/phrases are in the command, and so forth.

Figure 5:
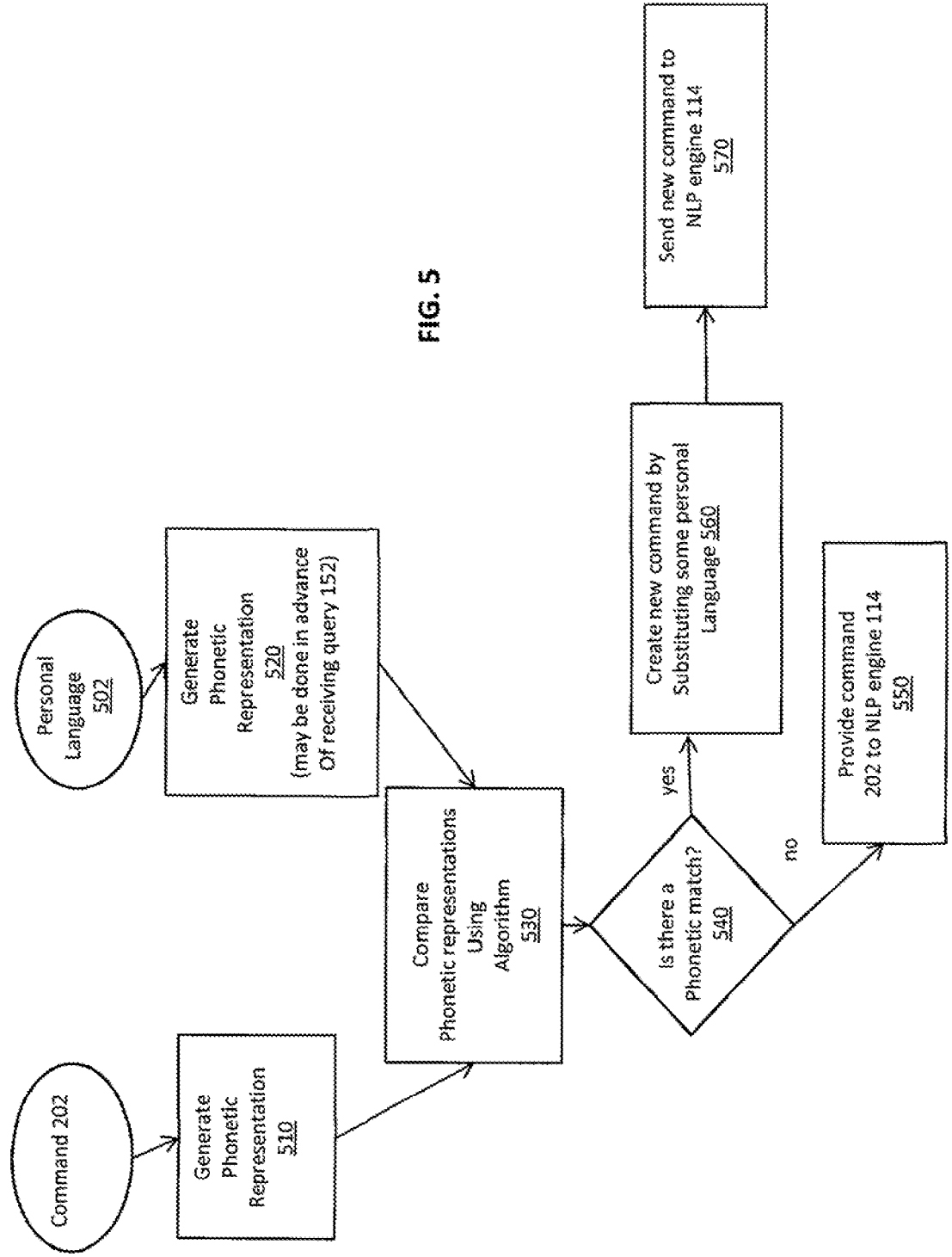
FIG. 5 is a flow diagram of exemplary operations (methods) for performing personal speech recognition in accordance with one embodiment.

Referring to FIG. 5, exemplary operations (methods) are shown that may be employed by the personalized speech module 250 according to one embodiment. At step 301, command 152 is received and converted to text command 202 which provided to the personalized speech module 250 by ASR engine 112. Command 202 is a text representation of the audio input that may or may not accurately represent the actual audio input that was uttered or otherwise provided. At step 510 in various embodiments, a phoneme generator 404 may be employed to create a phonetic representation of the command 202. The output of the phoneme generator 504 which is a phonetic sequence representing command 202 is directed to a comparator 406 for further processing.

In various embodiments, the phoneme generator 404 also generates a phonetic representation of each word and/or phrase in the personal language as indicated at steps 502 and 520. Creating the phonetic sequence for personal language may be accomplished offline (i.e. in advance of input command 152 being uttered). Output from the phoneme generator is directed to the comparator at step 530. In various embodiments, output from phoneme generator (or provided from electronic storage) may embody the phonetic representations of many different words and phrases from the computing device such as contact names, street names, restaurant names and the like. In some embodiments, it is to be appreciated with the benefit of this description that the personal language can include words limited to within a specific geographical area. For example, the personal language can include location names within a predetermined distance away from the computing device 102. A data transfer module (not shown) may be provided for facilitating the transfer of personal language from the computing device 102 (which may be stored in database(s) 104) to the intelligent services engine 200 (which may be stored in database(s) 215).

At step 530 a comparator 406 may be employed to ascertain the likelihood that any words and/or phrases from personal language are present in the input command 152. Comparator 406 may employ one or more algorithms alone or in combination to determine the likelihood. In some exemplary embodiments, a likelihood threshold is provided which may be predetermined (the likelihood threshold being modifiable). At step 440, the personalized speech module 250 determines if there is a phonetic match between the input command 152 and one or more words and phrases in the personal language. A phonetic match may be determined (by comparator 406 or the like) when the likelihood that a word and/or phrase from the personal language is present in the input command 152 is above the likelihood threshold defaulted by the system and/or provided by a system administrator.

If there is a phonetic match at step 540, command 202 may be modified by incorporating at least a portion of the word and/or phrase from personal language that was determined to likely be in the input command 152 above the likelihood threshold as in step 560. Subsequently, the new command generated at step 560 is sent to the NLP engine 214 at step 570. For example, say that an input command 152 such as "Schedule a meeting at 3 pm with Bob and Amar" is received by the computing device. ASR engine processes this input command 152 and may create a text command 202 such as "Schedule a meeting at 3 pm with Bob and a Mr." The personalized speech module 250 may create a phonetic representation of the text command 202 and the personal language and determine that the word "Amar" from the personal language is likely present in the input command 152. In contrast, if there is no phonetic match, the method proceeds to send the command to the NLP engine 214 at step 550.

In various exemplary embodiments, the output from the ASR engine 112 may be an N-best list of candidate commands 202. An N-Best list contains N (where N is any positive whole number) ranked hypotheses for the proper digital text representation of the input command 152. In such an embodiment, personal language is compared against several candidate commands provided by ASR module 212.

Figure 6:
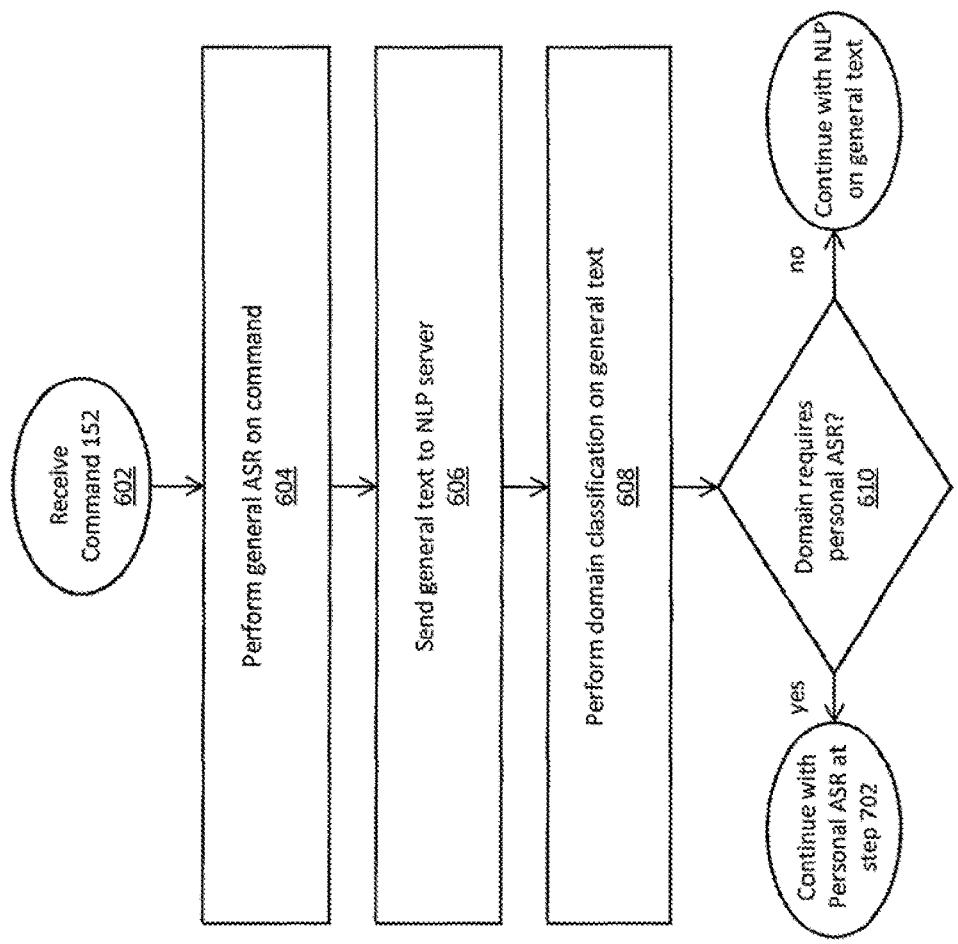
FIG. 6 is a flow of exemplary operations (methods) for performing personal speech recognition, in accordance with another embodiment.
Figure 7:
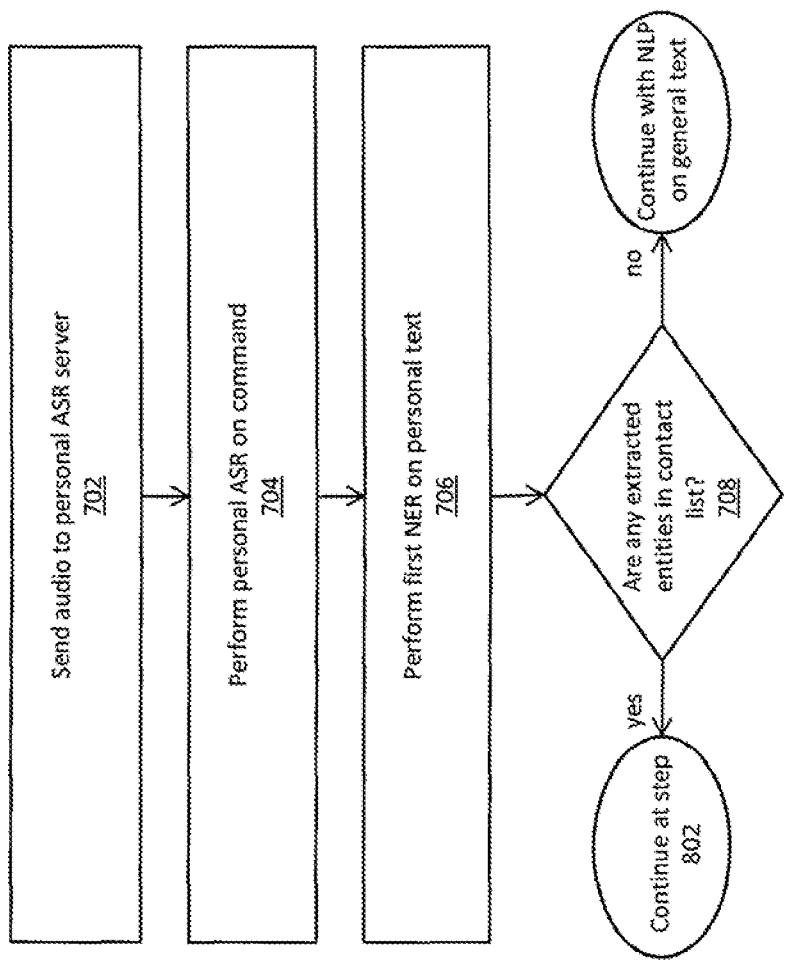
FIG. 7 is a flow of exemplary operations (methods) for performing personal speech recognition continuing from FIG. 6.
Figure 8:
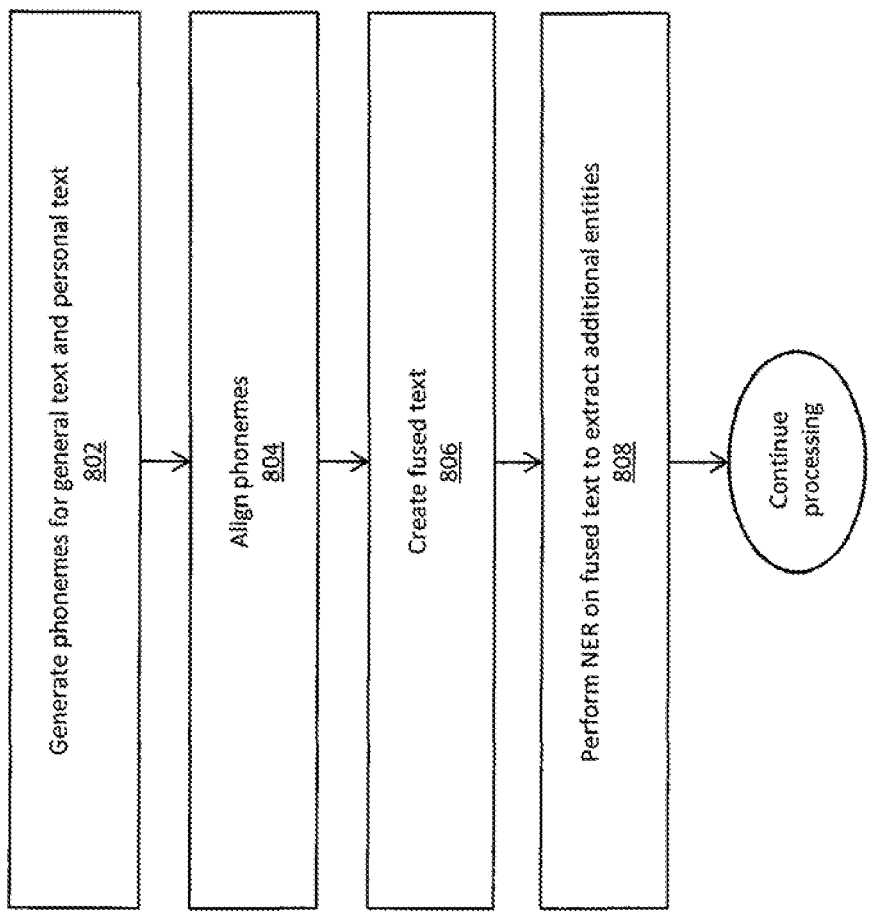
FIG. 8 is a flow of exemplary operations (methods) for performing personal speech recognition continuing from FIG. 7.

Reference is next made to FIGS. 6-8 to describe a flow of general operations (methods) of personalized speech recognition according to one embodiment. An input command 152 to application 101 which is provided to ASR module 212 at 602. ASR module 212 performs general ASR on the command at step 604 using an acoustic model and a general language model associated with a natural language such as English. At step 604, ASR module 212 creates a general text representation of the voice command and sends the general text to NLP engine 214 at step 606. NLP engine 214 partially derives the intent of the input command by classifying the input command 152 into a domain which is a general category of knowledge, information, and/or functionality (608). At 610, the domain in which the command 152 is classified is analyzed to determine if the domain requires specific automatic speech recognition. Domains that may require specific ASR include communication domains (eg. Email, text messaging, social media, etc.), calendar domains (eg. meetings, reminders, etc.), domains using specialist language (eg. Legal and medical dictation) and so forth. In one embodiment, decision 610 may be skipped, and instead, personal ASR is performed on all queries 152 regardless of the domain in which the input command 152 was classified.

If personal ASR is not required, the flow of operations continues via the 'no' branch to continuing natural language processing on the general text command 202. If personal ASR is required by the domain in which the command 152 is classified, then personal ASR is performed and the flow of operations continues via the 'yes' branch to step 702.

Turning to FIG. 7, operations continue at step 702 by sending the audio representing the input command 152 to a personal ASR server. Personal ASR server is a computing device running software configured to generate a personal text representation of the input command 152 using specific language associated with the specific user account or device, such as contact names, restaurants the user frequents, street and place names, and the like. At step 704, personal ASR is performed on the command 152, and a personal text representation incorporating personal language may be created. At step 706, named entity recognition (NER) is performed on the personal text to extract names and other personal language that may be embodied within the personal text. At step 708, the entities extracted from the personal text are compared against an electronic collection of personal language (such as in database 215) to see if there is a match between the extracted entities and personal language associated with the particular user. If there is a match, operations continue at step 802. If no match is found, it is determined that the personal text does not contain any specific language, and therefore, the flow of operations continue via the 'no' branch to natural language processing on the general text previously generated.

Referring next to FIG. 8, a phoneme sequence is generated for both the general text and the personal text. A phoneme may be defined as the smallest segmental unit of sound employed to form meaningful contrasts between utterances. As will be appreciated, the number and type of phoneme used from language to language may vary considerably. The invention is configured to apply a phoneme generator that is associated with the language of the input command 152 to generate the phoneme sequences.

At step 804, the phonemes of general text and the phoneme of the personal text are aligned using one or more techniques. In one embodiment, phoneme alignment is accomplished using dynamic programming, Viterbi algorithm, and/or other methods.

At step 806, a fused text is created by combining the entities determined to be personal language (step 708) with the general text. This procedure may involve substituting the phonemes in the general text with the corresponding phoneme representing the personal language in the personal text. A fused sentence may then be created from the fused phonemes by substituting the words that represent the phonemes of personal text. In one embodiment, a determination may be made that certain words in the general text correspond with certain personal language words in the personal text and a straight substitution may be made (i.e. personal language for the corresponding general language) to create a fused sentence.

In one embodiment, NER may be performed on the fused text to extract additional entities or composite words at step 808. Processing may then continue by the engine intelligent services engine 200 to accomplish a task or find information that is requested.

Figure 9:
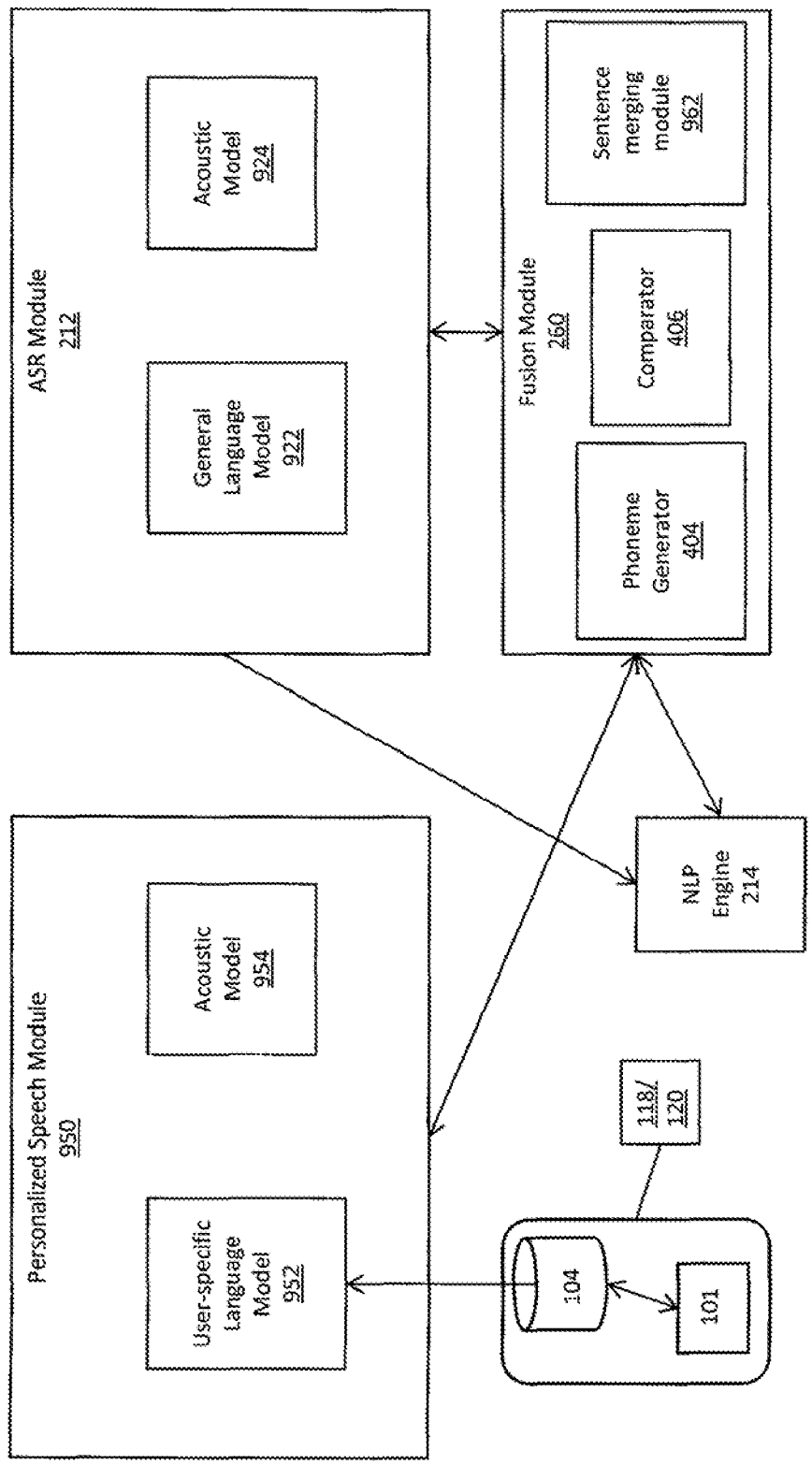
FIG. 9 is a block diagram of components of an exemplary personal speech recognition module in accordance with one embodiment of the invention.

Reference is next made to FIG. 9 to describe a personal ASR module 950 and a general ASR module 212 in accordance with one embodiment. The embodiments illustrated in FIG. 9 may be used to perform the operations (methods) described with reference to FIGS. 6-9. The embodiment illustrated in FIG. 9 (and other similar embodiments) may be employed in an environment in which a third party application (such as application 101) has access to the raw digital audio file that is provided by the microphone on the computing device 102 from an input command 152.

The ASR system includes a personalized speech module 950 configured to generate a personal text representation of the input command 152, a general ASR module 212 configured to generate a general text representation of the input command 152, and a fusion module 260 configured to generate a fused sentence that most accurately represents a query that contains personal language.

Personalized speech module 950 includes a specific language model 952 that contains specific personal language such as contact names from an address book, as well as general language that may be expected in an input command 152. Contacts can be added using one or more applications 101 on their mobile phone which are provided to language model 952 on a regular basis and/or upon the happening of certain events. An acoustic model 954 is provided that may be a file containing statistical representations of each of the distinct sounds that makes up a word. Each of these statistical representations is assigned a label called a phoneme. Speech recognition systems typically require an acoustic model, which is created by taking audio recordings of speech and their transcriptions (taken from a speech corpus), and 'compiling' them into a statistical representations of the sounds that make up each word (through a process called 'training'). They also require a language model or grammar file. A language model is a file containing the probabilities of sequences of words. A grammar is a much smaller file containing sets of predefined combinations of words.

ASR module 212 also includes its own acoustic model 924 and a general language model 922 that contains a corpus of general language that may be expected in an input command 152. The general language contained in general language model 922 may be substantially more copious than the general language contained in model 952. In one embodiment, personalized speech module 950 is optimized to recognize specific language and ASR module 212 is optimized to recognize general language. Personalized speech module 950 may provide as output a personal text string which is directed to fusion module 260, which ASR module 212 may provide as output a general text string which is directed to fusion module 260.

The fusion module 260 may include a phoneme generator 404 that is configured to generate a phoneme sequence for the general text provided by ASR module 212 and a phoneme sequence for the personal text provided by personalized speech module 950. A comparator 406 may be provided for aligning the phoneme sequences of the general and personal text, and for determining which of the personal words correspond with the general words (if any). Fusion module 260 may also include a sentence merging module 962 which is configured to create a fused sentence combining the personal words with the general words to accurately create a text representation of the input command 152. As shown, the fused sentence may be forwarded to NLP engine 214 for further processing.

UPDATING PERSONAL LANGUAGE MODEL 952

In some embodiments, personal language model 952 may be updated periodically and/or on the happening of certain events. For example, application 101 may update personal language model 952 every day at a certain time with any personal language that has been added since the following update. In another embodiment, each time personal language is added via application 101 or another application on device 102 (for example, when a new contact is added) personal language model 952 will be update accordingly.

EXAMPLE

In one example, an application 101 which provides a voice interface to an intelligent services engine 200 can be opened. The input command 152 received by the application which directs the input command 152 to intelligent services engine 200 which processes the command 152 using an NLP engine 214, directs a representation of the derived intent to an external service 118, and returns a formatted results to application 101 where the result can be viewed and interacted with. Application 101 and intelligent services engine 200 may provide a set of functionality (which may be grouped into categories or domains) such as text messaging, weather forecasts, stock prices, social media, and so forth.

In an exemplary interaction, the input command 152 "text Stephen Zhang hey how's it going". As shown in FIGS. 6-8, the input command 152 is converted to an audio format (e.g. pcm format) and sent to ASR module 212 to generate a general text representation of the command 152. The general text created by ASR module 212 in this example is "text Steven doing hey how's it going". As can be seen, the general ASR module 212 incorrectly assigned the word "doing" to the last name "Zhang".

The general text representation is then directed to NLP engine 214 to derive the intention. NLP engine 214 may begin deriving the intent by classifying the general text into a category of functionality, often referred to as a domain. In this exemplary interaction, NLP engine 214 may classify the general text into a "Text Message" category which provides text messaging functionality.

A decision is then made that the "Text Message" category requires personal ASR to be performed since the message is to be sent to a contact name or phone number. Given that personal ASR is to be performed on the command 152, the audio is sent to a personal ASR server which performs personal ASR on the command 152 using the personal ASR module 950. Continuing with the example, the personal text generated by personal ASR module 950 is "text Stephen Zhang hey how did going". As can be seen, the personal text correctly contains the name "Stephen Zhang" but misunderstands the latter part of the sentence by generating "hey how did going" instead of "hey how's it going" as was found in the command 152.

NER is then performed on the personal text generated by the personal ASR module 950 to extract the entities embodied with the personal text. In the example, NER performed by NLP engine 214 correctly extracts "Stephen Zhang" as an entity. The entities are compared to one or more personal language files (such as a contact list in a database) to see if any extracted entities are personal language. Continuing with the exemplary interaction, the entity "Stephen Zhang" is compared against a collection of personal language and a match is found in the contact list.

Given that the entity extracted is determined to be personal language, the general text and personal text are directed to the fusion module 260 so that the two text representations may be fused (merged) into a single representation that may accurately represent the command 152. A phoneme sequence is generated by a phoneme generator 404 for both general text and personal text. The phoneme sequences are then aligned by a comparator 406 so that the phonemes in the general text substantially align with the phoneme in the personal text. The two text representations are then fused by the sentence merging module 962 using one or more techniques. In one embodiment, the personal entities extracted from the personal text are substituted in their corresponding phonetic position in the general text to create a fused text. The text created by the sentence merging module is "text Stephen Zhang hey how's it going" which is identical to the input command 152.

The fused text may then be subject to one or more NER iterations to extract additional entities in the fused text. In the exemplary interaction, the NER on the fused text extracts the text "hey how's it going" as a message content entity. In one embodiment, the classification of the command as a text message with the entities of the recipient name and message body may then be stored in a data structure and diverted to other components for processing. Once the text message is sent by an appropriate internal service 120 (i.e. a service available on computing device 102) a notification may then be request additional input commands 152 via the application 101. Although the process of extracting useful information from the fused text may referred to herein as named entity recognition, the NLP engine 214 of the invention is configured to extract atomic entities as well as more complex items such as a text message or email message. The NER performed by the NLP engine 214 may also perform the task of semantic role labeling and extraction.

While various embodiments have been described above, it should be understood that they have been presented by way of example only, and not limitation. For example, any of the any of the elements associated with intelligent services engine 200 and personalized speech modules 250,950 (as well as ASR system 900) may employ any of the desired functionality set forth hereinabove. Furthermore, in various embodiments the intelligent services engine 200, personalized speech modules 250,950, and ASR system 900 may have more components or less components than described herein to employ the desired functionality set forth herein. Thus, the breadth and scope of a preferred embodiment should not be limited by any of the above-described embodiment.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

What is claimed is:

1. A computer implemented method of converting an audio input into a recognized text representation, the method comprising:
    receiving, at a general automatic speech recognition system on a server, the audio input;
    generating a first text representation of the audio input using the general automatic speech recognition system;
    classifying the first text representation into a domain using a natural language processing engine on the server;
    determining a personal speech recognition system based at least in part on the domain, wherein the determined personal speech recognition system is adapted to recognize a personalized word that is not included in a general language model associated with the general automatic speech recognition system;
    generating a second text representation of the entire audio input using the personal automatic speech recognition system, wherein the second text representation comprises the personalized word;
    extracting the personalized word from the second text representation;
    comparing the personalized word against an electronic collection of personal language;
    based on determining there is a match between the personalized word and an item in the electronic collection of personal language:
        creating a first phonetic representation using the first text representation;
        creating a second phonetic representation using the second text representation; and
        aligning the first phonetic representation with the second phonetic representation;
    generating a fused text representation comprising at least a part of the first text representation and at least a part of the second text representation based on the phonetic match; and
    providing the fused text representation as the recognized text representation for the audio input.

2. The method recited in claim 1, wherein the audio input is created in response to an audio signal received at a microphone.

3. The method recited in claim 1, wherein the personalized word comprises a contact name from an address book.

4. The method recited in claim 1, wherein the audio input is received at the general automatic speech recognition system from an application, wherein the application provides an interface for receiving the audio input.

5. A computer system for converting an audio input into a recognized text representation, the system comprising:
    a general automatic speech recognition system configured to receive the audio input and generate a first text representation of the audio input;
    a natural language processing engine configured to classify the first text representation into a domain;
    a personal automatic speech recognition system configured to receive the audio input and generate a second text representation of the audio input comprising a personalized word, wherein the personal automatic speech recognition system is based at least in part on the domain, and wherein the personal automatic speech recognition system is adapted to recognize the personalized word that is not included in a general language model associated with the general automatic speech recognition system;
    a phoneme generator configured to create a first phonetic representation using the first text representation and a second phonetic representation using the second text representation;
    a comparator configured to:
        extract a personalized word from the second text representation;
        compare the personalized word against an electronic collection of personal language;
        determine a match between the personalized word and an item in the electronic collection of personal language; and
        provide the determined match to the phoneme generator; and
    a fused text generator configured to:
        create a fused text representation based on the first phonetic representation and the second phonetic representation based on phoneme alignment between the first phonetic representation and the second phonetic representation; and
        provide the fused text as the recognized text representation for the audio input.

6. The system of claim 5, wherein the comparator is further configured to provide an indication whether the personal word is present in the first text representation, wherein the indication indicates a location of the personal word within the first text representation.

7. The system of claim 5, further comprising a text substitution module configured to substitute a portion of the first text representation with personal word to create a fused text representation of the audio input.

8. The system of claim 5, further comprising a microphone for receiving an audio signal, wherein the audio input is created in response to the audio signal.

9. The system of claim 5, wherein the personal word comprises a contact name from an address book.

10. The system of claim 5, wherein the personal word comprises a location name associated with a location, the location being within a predetermined distance from an input device providing the audio input.

11. The system of claim 5, wherein the personal word is selected from a plurality of common words associated with the domain.

12. The system of claim 5, wherein the personal word is provided by a data transfer module to the phoneme generator.

13. The system of claim 5, wherein the general automatic speech recognition system is configured to receive the audio input from an application, wherein the application provides an interface for receiving the audio input.

14. A system comprising:

at least one processor; and memory encoding computer executable instructions that, when executed by the at least one processor, perform a method of converting an audio input into a recognized text representation, the method comprising:

receiving, at a general automatic speech recognition system on a server, the audio input;

generating a first text representation of the audio input using the general automatic speech recognition system;

classifying the first text representation into a domain using a natural language processing engine on the server;

determining a personal speech recognition system based at least in part on the domain, wherein the determined personal speech recognition system is adapted to recognize a personalized word that is not included in a general language model associated with the general automatic speech recognition system;

generating a second text representation of the entire audio input using the personal automatic speech recognition system, wherein the second text representation comprises the personalized word;

extracting the personalized word from the second text representation;

comparing the personalized word against an electronic collection of personal language;

based on determining there is a phonetic match between the personalized word and an item in the electronic collection of personal language:

creating a first phonetic representation using the first text representation;

creating a second phonetic representation using the second text representation; and aligning the first phonetic representation with the second phonetic representation;

generating a fused text representation comprising at least a part of the first text representation and at least a part of the second text representation based on the phonetic match; and providing the fused text representation as the recognized text representation for the audio input.

15. The system recited in claim 14, wherein the audio input is created in response to an audio signal received at a microphone.

16. The system recited in claim 14, wherein the personalized word comprises a contact name from an address book.

17. The system recited in claim 14, wherein the method further comprises substituting a portion of the first text representation with the personalized word to create a fused text representation of the audio input.

18. The system of claim 14, wherein the personal word comprises a location name associated with a location, the location being within a predetermined distance from an input device providing the audio input.

19. The system of claim 14, wherein comparing the first phonetic representation and the second phonetic representation comprises aligning a first set of phonemes from the first phonetic representation and a second set of phonemes from the second phonetic representation.

20. The system of claim 14, wherein the general automatic speech recognition system is configured to receive the audio input from an application, wherein the application provides an interface for receiving the audio input.

* * * * *